INVENTOR.
MICHAEL J. MOORE
BY James J. Wood
ATTORNEY

May 15, 1962 M. J. MOORE 3,035,254

BINARY MAGNETIC COUNTER WITH ONE CORE PER STAGE

Original Filed June 13, 1956 2 Sheets-Sheet 2

INVENTOR.
MICHAEL J. MOORE
BY James J. Wood
ATTORNEY 3,035,254
Patented May 15, 1962

3,035,254

BINARY MAGNETIC COUNTER WITH ONE CORE PER STAGE

Michael J. Moore, Montgomery County, Pa., assignor to Burroughs Corporation, Detroit, Mich., a corporation of Michigan Original application June 13, 1956, Ser. No. 591,129, now Patent No. 2,930,029, dated Mar. 22, 1960. Divided and this application Oct. 8, 1959, Ser. No. 845,134
9 Claims. (Cl. 340—174)

This application is a division of my copending application Serial Number 591,129, filed June 13, 1956, entitled "Binary Magnetic Counter with One Core Per Stage," now U.S. Patent No. 2,930,029.

This invention relates to binary magnetic counters, and more particularly, it relates to binary magnetic counter circuits utilizing a single magnetic core, such as described in the copending United States patent application of W. C. Elmore, Serial No. 323,828, filed December 3, 1952 for "Magnetic Binary Counter."

In order to provide rugged and reliable circuits for use in counting operations such as found in electronic computer circuits, bistable state magnetic cores have been utilized. These cores generally exhibit a substantially rectangular hysteresis characteristic resulting in magnetic remanence which is a large percentage of the saturation flux density of the core.

While binary magnetic counter circuits have been known in the prior art, in many cases they have required two magnetic cores together with complex circuitry. However, there is provided in the above mentioned application a simple bistable state circuit comprising a single magnetic core which is utilized as a binary counter. The present invention employs this binary magnetic counter device in multistage binary counter systems which operate with reduced noise and high reliability, while employing simplified and advantageous interstage coupling circuits.

It is therefore an object of the present invention to provide improved magnetic binary counter circuits and systems.

Another object of the invention is to provide simplified and reliable multistage binary magnetic counter systems having a single magnetic core per stage.

A further object of the invention is to provide magnetic binary counter circuits of such reliability and stability that they may be used in digital computer systems.

In accordance with the invention, therefore, there is utilized a single core binary counter circuit constructed of a material providing a substantially rectangular hysteresis characteristic. The binary counter circuit is responsive to provide a single output pulse from each pair of successive input pulses. This is accomplished by a storage capacitor connected with the input source and a winding about the core so that the capacitor acquires a substantial charge from input pulses arriving when the core is in one stable magnetic state, and conversely the capacitor acquires little charge from input pulses arriving when the magnetic core is in its other stable magnetic state. This operation is produced by connecting a coil about the magnetic core in series with the storage capacitor and applying input pulses of one polarity to the series circuit in such magnitude that the core is switched to one of its stable states whenever it resides in the opposite state.

The capacitor is thereby charged from the input pulses whenever the core is in the one stable state, and the capacitor and input pulse source are so related in this operation that enough charge is retained by the capacitor both to re-switch the core back to its original state and to produce an output signal upon discharge. A discharge circuit is provided for the storage capacitor such that current flows from the capacitor through a winding about the core, which may be same winding connected in series with the capacitor, so that discharge current will cause the core to switch into the magnetic stable state opposite from that which resulted in charging of the capacitor. Thus, the series winding coupled to the pulse input source and capacitor will alternately provide a high and a low impedance to the pulse input source as the core resides in different magnetic states, respectively resulting in substantial or little charge on the capacitor. In the high impedance state of the winding the input pulse source provides sufficient current through the winding to switch the core to its other stable magnetic state without enabling the storage capacitor to acquire a substantial charge.

Interstage coupling between binary counters of the type described is accomplished by providing magnetic coupling from one stage to the next by means of a unilaterally conducting device. Coupling circuits may be used deriving output signals either from a magnetic output winding upon the binary counter core or from the capacitor by providing conductive coupling to the next stage of the binary counter. In both coupling circuits the unilateral conductor device is afforded as a decoupling device to assure that a low impedance discharge path is not provided for the load storage capacitor circuit through the output circuit of the preceding stage. In the conductive coupling circuit a further asymmetrically conducting device is inserted as part of the resistive capacitor discharge network to assure proper distribution of current resulting from discharge of the capacitor between the load circuit and the winding of the binary counter which causes the core to switch to its opposite state.

In accordance with the invention, circuits are provided for preventing partial switching of the magnetic core during the charging of the storage capacitor when the core is in that stable state in which its winding exhibits low impedance and for preventing extreme sensitivity to pulse direction because of capacitor charging after the core is switched by input pulses from that state of the core in which the winding exhibited high impedance.

A multistage binary counter system is provided by coupling one binary counter to another in a cascade chain of binary counter circuits. In one multistage counter circuit embodiment, input pulses are provided only at the initial binary counter stage and thereby effect counting through a series of binary counter stages without the provision of further energy sources at other counter stages, thereby considerably simplifying the circuit so that the range of values of different components which must be correlated for successful operation is extended. This circuit, in accordance with the invention, is provided with interstage coupling circuits for producing reliable operation by reducing noise currents induced during charging of the capacitor of one stage. Thus, a noise cancellation impedance device is coupled in the transfer circuit between two stages.

Further features and objects of the invention will be found in the following more detailed description of the invention which is referenced to the accompanying drawings in which.

Figure 5:
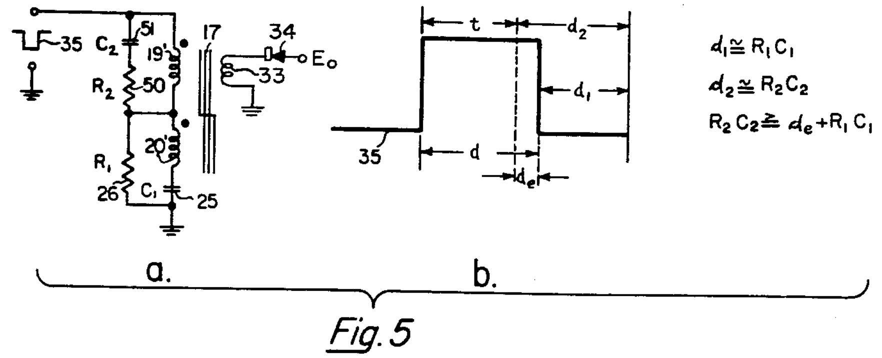
Figure 6:
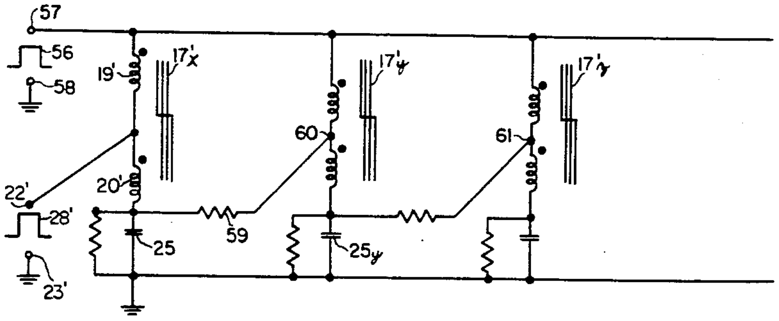
Figure 7:
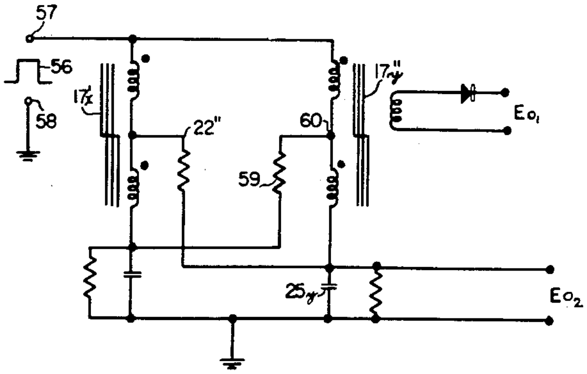

FIGURE 5*a* is a schematic circuit diagram of a binary counter circuit embodiment reducing the circuit sensitivity to the duration of input pulses, and claimed in patent application Serial No. 591,129;

FIGURE 5*b* is an accompanying waveform diagram;

FIGURE 6 is a circuit diagram of a synchronous multistage binary magnetic counter circuit embodiment of the invention, operable in response to application of clock pulses at each counter stage; and FIGURE 7 is a circuit diagram of a two stage recirculating circuit embodiment of a synchronous magnetic binary counter.

Figure 1:
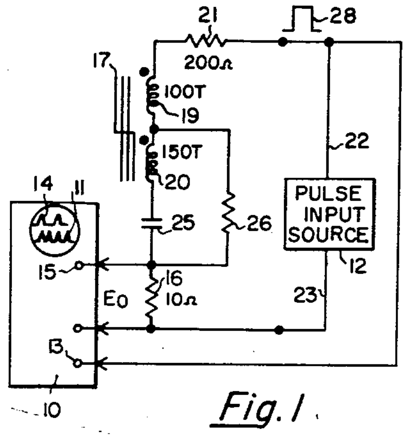
FIGURE 1 is a schematic circuit diagram of a single core magnetic binary counter circuit as claimed in the aforesaid Elmore application.

The single core counter circuit utilized in accordance with the present invention is schematically illustrated in FIGURE 1 as connected to an oscilloscope output means 10, which shows the relationship between input pulses 11 provided by the input pulse source 12 at terminal 13, and the output pulse 14 produced at the alternate oscilloscope input terminal 15 by the binary counter circuit. The binary counter output signal results from current flow through the output resistor 16.

The core 17 of the counter circuit exhibits a substantially rectangular hysteresis characteristic and may comprise, for example, a tape wrapped molybdenum permalloy core material 3/16″ wide and .00025″ thick, with 20 wraps about a toroidal bobbin having a diameter of approximately ½″ diameter.

About the core 17 is a tapped winding having an upper section 19 and lower section 20 respectively comprising 100 and 150 turns about the toroidal core 17. The pulse input source 12 supplies to the upper section 19 of the winding through the 200 ohm decoupling resistor 21, a substantially square wave pulse which operates the circuit as a binary counter when its duration is in the range of one half to one microsecond and its amplitude is in the range from 100 to 250 milliamperes. The pulses are applied at source output leads 22 and 23 to pass current in series circuit through both sections 19 and 20 of the core winding and the storage capacitor 25. This capacitor, with a value in the order of .001 microfarads, will permit binary counter action of the magnetic core 17 when the discharge path is provided through the lower section 20 of the winding and the discharge resistor 26, which may have a value in the range of 470 to 1500 ohms.

Accordingly, when a pulse having a specified single polarity is provided from the input source, such as a typical positive pulse 28 at the pulse output lead 22, it will cause current to flow through the core winding and the storage capacitor in series circuit therewith, as well as through the output resistor 16. The pulse input source 12 applies pulses through a coupling device such as a diode, having a high enough impedance between terminals 22 and 23 so that current discharging from the capacitor 25 through the source is negligible. Thus, a single discharge path through winding section 20 and the discharge resistor 26 is assumed. Any capacitance in the pulse input source which would cause ringing or transients because of the high impedance characteristics is filtered by the 200 ohm decoupling resistor 21. The approximate spacing of input pulses provided for reliable operation is 25 microseconds, which gives an operating frequency in the order of 40 kc.

In operation, the energy content of the input pulse is such that current flow through the 250 turns of series winding sections 19 and 20 when finding the core in that state in which its windings exhibit high impedance will switch the core 17 from that stable magnetic state to the opposite state in which its windings exhibit low impedance state, and will produce little charge on the capacitor

25. Thus, when the core is found in one stable state, the winding sections 19 and 20 present a high impedance to the input pulse 28, and the core is switched to the opposite magnetic state where the winding sections 19 and 20 present a low impedance to the succeeding input pulse 28. In this condition, substantially the entire energy of the pulses is passed to the storage capacitor 25, which can immediately discharge upon termination of the input pulse. Since upon discharge of the capacitor, current will pass through the winding section 20 in an opposite direction to the current flow therethrough from the input pulse 28, the core will be switched by the discharge current through winding section 20 from its stable state in which its windings exhibit low impedance back to its stable state in which its windings exhibit high impedance, thereby completing a single cycle of operation.

Thus, assuming the core is initially in that state in which its windings 19, 20 exhibit high impedance with respect to input pulses 28, the first pulse will switch the core to the opposite state by means of the current flowing through winding sections 19 and 20, without substantially charging the capacitor 25. The next pulse will find the core in the opposite state in which its windings exhibit low impedance, thereby charging capacitor 25 fully and permitting the core thereafter to be switched back to its initial state by capacitor discharge current through winding section 20. Therefore, a cycle of operation requires two successive input pulses and fulfills the requirements of a binary count by producing a charge upon capacitor 25 for every other input pulse arriving.

Since the core switches in opposite direction with every other input pulse and the capacitor 25 is charged with every other pulse, and the input pulse 28 passes a larger current through the series circuit in one state of the core than the other, various types of output circuits might be provided. As shown in FIGURE 1, for example, a current detector device, such as the 10 ohm series resistor 16, may be employed to produce output pulses upon arrival of input pulses 28 whenever the core is in that state in which its winding exhibits low impedance and thereby produce a voltage pulse across the resistor. An output indication could similarly be detected by sampling the voltage appearing at the capactior 25, since the capacitor is alternately charged and uncharged with the successively presented input pulses. A further output circuit could comprise a winding about the core 17, together with a series unilaterally conductive circuit which permits an output pulse only during switching of the core in one direction from a given remanence condition to the opposite remanence condition. In this manner, by proper polarization of the unilaterally conductive circuit an output signal may be derived in either condition, representing the alternately presented input pulses of opposite phase relationship which cause the core to be switched.

Figure 2:
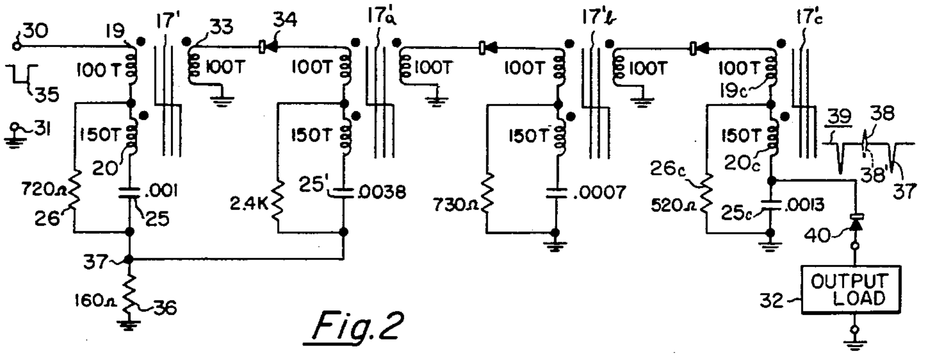
FIGURE 2 is a schematic circuit diagram of an asynchronous multistage binary counter system, operable in response to input pulses at the first stage.

A synchronous multistage cascade counter circuit utilizing the single core binary counter is illustrated schematically in FIGURE 2. This circuit is asynchronous, since the input pulses applied at terminals 30 and 31 may be reproduced at subsequent stages at time periods related to inherent operation times of the cascade circuits. Thus, the corresponding output pulses at the output load circuit 32, do not necessarily bear a specific harmonic time relationship with the input pulses. Since the input pulses for this system operate several stages of the counter, each stage receives a modified pulse. Accordingly, the respective stages are shown with values other than those used in operation of the single-stage counter circuit previously described. Thus, the present circuit is operable with negative input pulses of 2½ microseconds duration and with an amplitude in the order of 390 to 570 milliamperes. Likewise, to afford better circuit operation with similar windings on the magnetic cores in the several stages which are generally similar to those previously described, and therefore bear the reference numeral 17′, different circuit values are used for the accompanying component parts in the several stages. Different core materials or cores of decreasing size may be used if desired to more efficiently use the smaller amounts of energy along the circuit.

In this multistage counter circuit, each stage is operable in the manner heretofore described and therefore cascade binary counter circuit operation is provided so that the output load circuit 32 will receive a pulse signal for every 16 input pulses at input terminals 30 and 31. The interstage coupling between the first core 17′ and the second core 17a′ comprises a 100 turn output winding 33 upon core 17′ and a series unilateral conductor such as crystal diode 34 connected therewith. Thus, when a negative input pulse 35 is received at the input terminals 30 and 31, the core 17′ which is assumed to be in that state in which its windings exhibit high impedance is switched by current flow in the winding sections 19 and 20 from terminal 31 to terminal 30, thus sending the core into its opposite remanent condition.

Because of polarity of the diode 34, when the core 17′ switches to induce a potential in winding 33, an input pulse to core 17a′ will be produced. When the next input pulse is presented at terminals 30 and 31 capacitor 25 will be charged through the low impedance of winding sections 19 and 20, thus permitting the core 17′ to switch in the opposite direction upon termination of the input pulse 35, permitting discharge of the capacitor through winding section 20. During switching in the opposite direction in response to the discharge current, the core 17′ will not produce an output current pulse in winding 33, which serves as an input signal for core 17a′, because of diode 34. In similar manner the output signals are transmitted from one cascade circuit to the next. When an output load circuit 32 is provided in the last counter stage at core 17c′ it may be desirable to produce an output signal from capacitor 25c rather than at an output winding on core 17c′. In general, more reliable operability may be obtained when a signal is produced at the last stage in this manner. In a multistage counter of this type, the amount of input pulse energy is somewhat attenuated at core 17c′ because of losses throughout the preceding circuits, and the charge on capacitor 25c has been found to produce a stronger output indication than a further output winding circuit on core 17c′, and yet desirable features of magnetic interstage coupling are maintained.

A further advanatge, which may be realized when using this type of output coupling circuit is illustrated by the output waveform 39 wherein the noise pulses occurring at the capacitor 25c during direct switching of the core 17c′ are presented in opposite polarity 38 to that of the signal pulses 37 in which polarity the noise pulses 38′ are usually presented. By using the coupling rectifier 40, the noise pulses thereby are essentially eliminated, thereby causing a substantial improvement in operation.

This operation results by using proper circuit values as shown in FIG. 2 together with input pulses of proper values to cause input pulse current finding the core 17c′ in that state in which its windings exhibit high impedance to fined separate paths through resistor 26c and winding section 20c. Since all input pulse current flows through winding section 19c autotransformer action causes winding 20c to develop counter E.M.F. enough to cause capacitor 25c to attain a charge opposite in polarity to that normally expected. Circuit parameters can be adjusted if proper for other operating conditions to cause relatively no noise pulse by balancing the induced voltage to eliminate current through capacitor 25c. Discharge of capacitor 25c upon termination of the input pulse when receiving the opposite polarity "noise" signal will serve upon discharge to continue the switching of the core in the same direction. This discharge current passes through the minor loop containing winding section 20c, resistor 26c and capacitor 25c.

When inductive coupling between stages is provided by output windings 33, some current is passed in a forward direction through the diode 34 by coupling from the series winding sections 19 and 20 when the capacitor is charging from input pulses in the low impedance state of the windings. This occurs because in practice the hysteresis characteristics of the core are not exactly rectangular and the cores go from remanence to saturation without switching, thereby affording some magnetic coupling. Such action results in current flow in the output circuit which may result in partial switching of the driven core 17a′, thereby establishing an unfavorable signal-to-noise ratio. It is, however, possible to cancel this induced voltage, particularly in the first interstage coupling circuit which receives the greatest current flow, by returning the capacitor 25′ in the second stage to a point below signal ground potential in the first stage, such as by the connection 37 at resistor 36 in the input pulse circuit. Thus, with a resistance in the order of 160 ohms, the high current condition during charge of capacitor 25 will cause terminal 37 to acquire a negative potential sufficient to cut off or otherwise inhibit current flow through diode 34 and prevent noise inducement in core 17a′ when input pulses are applied during the low impedance state of the windings 19, 20 of core 17′.

Figure 3:
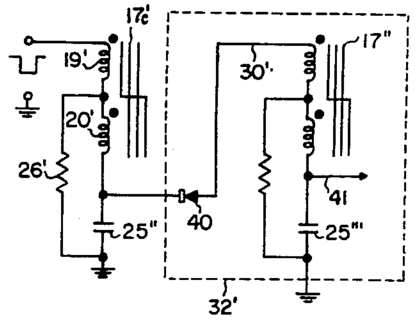
FIGURE 3 is a schematic circuit diagram of conductive interstage coupling circuits utilized in connection with multistage binary magnetic counter circuits of the invention.

When interstage conductive coupling from the capacitor is used in this type counter, such as indicated in the output load circuit 32 of FIGURE 2, the circuit shown in FIGURE 3, is representative. In this circuit, a series coupling rectifier 40 is afforded in the conductive coupling path between cores 17c′ and 17″. Thus, whenever capacitor 25″ is charged in the low impedance condition of windings 19′, 20′ it is provided with two discharge paths, namely, the first through winding section 20′ and the second through rectifier 40 to the input lead 30′ of the output load counter circuit 32′. The charge on capacitor 25″ is made sufficient to switch both core 17c′ and 17″, or, conversely, to switch core 17c′ and charge capacitor 25‴ with enough energy to reverse the polarity of the core 17″.

Figure 4:
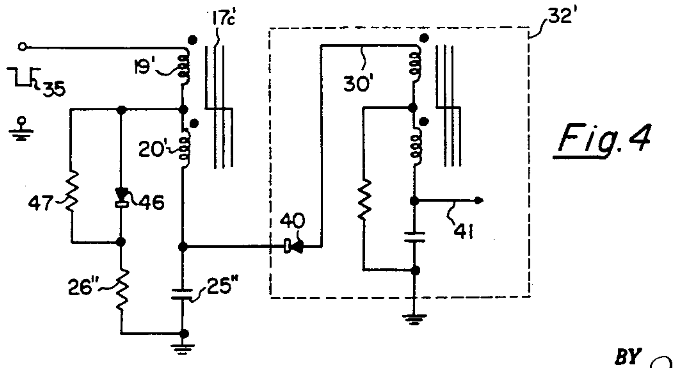
FIG. 4 is a schematic circuit diagram of a multistage binary counter circuit modification, providing improved current distribution between the load circuit and the binary counter core switching circuit.

In this type of conductive coupling circuit certain operating parameters may make it desirable to choose specific impedance values for the load counter circuit 32′ and the winding section 20′, which cause unfavorable transfer of charge from capacitor 25″ between the load core and the reswitching circuit. Accordingly, the circuit embodiment of FIGURE 4 is desirable in order to permit wider tolerances in the parameters of the respective binary counter circuits when utilizing conductive coupling from the storage capacitor circuit. This circuit permits the relative impedance of the two storage capacitor discharge paths to be related so that the proper operating current flows respectively through the winding section 20′ and the counter circuit 32′ from the storage capacitor 25″. Let it be assumed generally that it is desirable to limit the current flow through the winding section 20′ to a value less than that flowing through the counter circuit 32′. This condition exists in multistage counter circuits where the output lead 41 of counter stage 32′ also must provide enough energy for actuating a further load circuit which derives energy directly from the charge stored in the capacitor 25″.

This resistance of the capacitor discharge path through winding section 20′ and resistor 26″ is made high by introducing the diode 46, poled in such a direction that the high back impedance is presented to the discharge current of the capacitor 25″. This permits a relatively larger percentage of current to flow through diode rectifier 40 in the load circuit. The shunting resistor 47 about diode 46 may be utilized to reduce the back resistance of diode 46 to the amount necessary to produce proper current flow distribution. Thus, the diode 46 and resistor 26″ may serve to provide substantially the same impedance to the input pulses 35 as that in the other embodiments of the invention so that reliable damping and similar operation may be produced.

It is noted that in operation of the single core binary counter circuit of the invention that the relative numbers of turns in the winding sections 19′ and 20′ may be varied. Thus, in one such case the winding section 19′ disappears, leaving only the single winding section 20′ in the circuit. However, more stable operation is possible with the tapped two section winding embodiment, which provides a different number of turns respectively for the input pulses and the capacitor discharge path. When using this preferred type of circuit construction, less sensitivity to the pulse duration may be accomplished in the manner shown in FIGURE 5. Normally, the pulse duration is somewhat critical, since enough energy must be contained in the pulse to switch the core 17 and thereafter quickly terminate because any excess pulse energy would find the core 17 then in that state in which its windings exhibit low impedance and serve to produce enough charge on capacitor 25 to produce undesirable noise components.

In the circuit of FIGURE 5*a* this condition is mitigated by the provision of a series resistor 50 and capacitor 51 connected across the winding section 19′. This circuit serves to charge a separate storage capacitor under conditions which permit the reswitching storage capacitor 25 to attain a charge from a pulse of excessive duration. Consider the case where the core 17 is in that state in which its windings 19′, 20′ exhibit low impedance at the time of application of a first pulse 35. Storage capacitor 25 charges rapidly and substantially fully, since windings 19′ and 20′ offer substantially negligible impedance. The voltage drop across winding 19′ is, accordingly, very low, and capacitor 51 in shunt therewith charges to but a negligible extent. At the termination of the first pulse, which may be assumed to have been of extended duration, storage capacitor 25 discharges through winding 20′ and resistor 26 and the discharge current is effective to switch core 17 to the opposite state. Thereafter, when a second pulse 25 is applied, it finds windings 19′, 20′ in their high impedance state. The voltage of the applied second pulse divides between winding 19′ and 20′ in proportion to the relative impedance of the two windings, and capacitor 51, in shunt with winding 19′, charges to an appreciable voltage. Meanwhile, in response to the second pulse, core 17 is switching to that state in which its windings 19′, 20′ exhibit low impedance. Assuming that the duration of the second pulse 35 is extended beyond the time required to switch core 17, the extended portion of the pulse finds the winding 19′ and 20′ in the low impedance state and hence current tends to flow into capacitor 25 to charge the same. However, following termination of the second pulse the already charged capacitor 51 now discharges through the low impedance of winding 19′ and in so doing opposed the flow of current out of storage capacitor 25. Stated another way, since the discharge current of capacitor $C_2$ in flowing through winding section 19′ will produce mmf. in core 17 opposite to that produced by the noise signal on capacitor 25 when discharging through winding section 20′, excessive duration of the input pulse may be tolerated over a much longer range.

In experimental observations, this circuit scales properly as a binary counter even when pulse amplitudes at capacitor 25 are substantially equal for "signal" and "noise" conditions. Therefore it is desirable in this circuit to produce output signals only in response to switching of the core 17 as afforded at output winding 33.

Assuming an operable counter with elements 19′, 20′, 25 and 26 which is subjected to excessive duration input pulses 35, the values of $C_2$ and $R_2$ may be readily chosen on an empirical basis for best circuit operation. However, some circuit comparisons on a theoretical basis which may help to understand operation of this circuit may be considered in connection with the waveform diagram of FIGURE 5*b*. The driving current pulse 35 is signified with a duration $d$. Let it be assumed that the direct switching time of the core is $t$. This provides an excess pulse duration of $d_e$. As specified in the accompanying chart, the duration $d_1$ is the approximate time constant of the RC circuit $R_2C_2$. Thus, after the core is switched, a current flows into capacitor $C_1$ during period $d_e$ which discharges during the noise interval period $d_1$.

Discharge of capacitor $C_1$ from its fully charged condition while reswitching the core will place a small charge on capacitor $C_2$ in an auxiliary discharge circuit but the capacitor $C_2$ will discharge through the winding section 19′ in a direction which continues to drive the core into the same stable state so that normal switching is not disturbed. However, when the impedance of winding sections 19′ and 20′ is high, the capacitor $C_2$ should attain sufficient charge to cause current to flow through winding 19′ and create an mmf. in opposition to that created by current stored upon capacitor $C_1$ during the excess time duration $d_e$ of the input pulse. In this manner, pulses may be tolerated of greater duration than otherwise possible when utilizing the single core binary counter operation heretofore described.

In some applications it is desirable to provide a synchronously actuated multistage binary counter circuit. Thus, a multistage counter may be constructed to utilize the single core binary counting action in a manner illustrated in FIGURE 6, wherein clock pulses 56 are necessary at terminals 57 and 58 in order to permit counting operation of each counter stage at specified time. In the prior embodiments of the invention, it has been assumed that the pulse input source is of the high impedance type, such as a constant current driver which does not permit discharge current to flow from the capacitor circuit. However, in the circuit of FIGURE 6, the input counting signals 28′ at terminals 22′ and 23′ are assumed to be derived from a source of low enough impedance or of such characteristics that the storage capacitor 25 may have a discharge path through winding section 20′ and the input count signal source. In this embodiment, the coincident pulse energy of both clock pulses 56 and input count signals 28′ is necessary to provide switching of the core 17′ from one stable state to another or, conversely, to produce enough charge on capacitor 25, both to actuate the reswitching of the core 17*y*′ and to pass an input signal to terminal 61 of core 17*z*′. Thus, it is evident that the switching may be accomplished at specified time periods defined by clock pulses 56 in order to provide synchronous circuit operation.

A special case of this type of counter is illustrated in FIGURE 7, wherein two stages are intercoupled in a ring counter arrangement. Thus, core 17*x*′ is provided with input signals at terminal 22″ from the output circuit of core 17*y*″ upon discharge of storage capacitor 25*y*. Conversely, core 17*x*′ operates in the manner described in FIGURE 6 to provide an input signal at terminal 60 for core 17*y*″. This circuit, in actuality, may be considered a flip-flop or counter circuit, operated directly from terminals 57 and 58, in response to input waveforms 56. If cores are initially in opposite states, enough energy is produced from the initial clock pulse because of the high impedance of the windings of one core to store a charge on the capacitor located in the circuit of the core having low impedance windings to produce an aiding signal on either lead 22″ or 60 for the required coincident action. Output signals may be taken from either or both cores, either conductively from capacitors, or inductively from the cores, as illustrated by the output terminals $Eo_1$, $Eo_2$.

It is apparent from the foregoing description of the invention in its various detailed forms, that there is provided a novel and useful multistage binary counter circuit, the features of novelty of which are described with particularity in the appended claims.

I claim:

1. A counter circuit comprising a first magnetic core and a second magnetic core each capable of assuming either of two stable states; a first winding on said first core and a winding on said second core, each of said windings exhibiting low impedance when its associated core is one state and exhibiting high impedance when it associated core is in its other state, each of said windings having a tap at an intermediate point for dividing each winding into first and second sections; a second winding on said first core; a first capacitor and an impedance connected in series with both sections of said first-core first winding; a first resistance connected in shunt with both said second section of said first-core first winding and said first capacitor; a second capacitor connected in series with both sections of said second-core winding; a second resistance connected in shunt with said second section of said second-core winding and said second capacitor; means, including a series diode, connecting said first core second winding in shunt across a series circuit comprising said second-core winding, said second capacitor and said impedance; means for applying input pulses to be counted across a series circuit comprising said first winding, said first capacitor and said impedance for driving current therethrough to switch said first core or alternatively to charge said first capacitor to a relatively large extent depending upon whether said first core is in its one or other state at the time the input pulse is applied, the current to charge said first capacitor to said relatively large extent flowing through said impedance and developing a voltage thereacross effective to reverse bias said diode, thereby to inhibit flow of noise currents therethrough, said charged first capacitor upon termination of flow of said charging current discharging through said first resistance and the second section of said first winding to switch said first core to its other state, thereby to induce a voltage in said first-core second winding to drive induced current of greater or lesser amount through said second-core winding and into said second capacitor according to the state of said second core, thereby either to switch said second core or to charge said second capacitor to a relatively large extent depending upon the state of said second core.

2. Apparatus as claimed in claim 1 characterized in that said impedance is a resistance.

3. Apparatus as claimed in claim 1 characterized by the provision of means for deriving an output signal from the second core.

4. Apparatus as claimed in claim 2 characterized by the provision of means for deriving an output signal from the second core.

5. A counter circuit comprising first and second stages, each stage comprising a single magnetic core capable of assuming either of two stable states; a first winding on each core exhibiting low impedance when its core is in one state and exhibiting high impedance when its core is in its other state; a capacitor connected in series with the first winding of each core; an impedance in series with said first-stage first winding and capacitor; a second winding on said first-stage core; means, including a diode and said impedance, coupling said second winding to said second stage; means for applying input pulses to be counted across a series circuit comprising said first-stage first winding, said first-stage capacitor and said impedance to switch said first-stage core or alternatively to charge said first-stage capacitor to a relatively large extent depending upon whether said core is in its one or other state, the current to charge said first-stage capacitor to said relative large extent flowing through said impedance and developing a voltage thereacross which reverse biases said diode, thereby to inhibit the flow of noise currents therethrough, said charged first-stage capacitor upon termination of said charging current discharging through at least a portion of said first-stage first-winding to switch said core to its other state, thereby to induce a voltage in said first-stage second winding to drive induced current of greater or lesser amount through said second-stage winding and into said series capacitor, thereby either to switch said second-stage core or to charge said second-stage capacitor to a relatively large extent depending upon the state of said second-stage core.

6. Apparatus as claimed in claim 5 characterized in that said impedance is a resistance.

7. Apparatus as claimed in claim 6 characterized by the provision of means for deriving an output signal from the second stage.

8. A counter circuit comprising first and second stages, each stage comprising a single magnetic core capable of assuming either of two stable states; a first winding on each core exhibiting low impedance when its core is in one state and exhibiting high impedance when its core is in its other state; a capacitor connected in series with the first winding of each core; an impedance in series with säid first-stage first winding and capacitor; a second winding on said first-stage core; means, including a diode and said impedance, coupling said second winding to said second stage; and means for applying input puses to be counted across a series circuit comprising said first-stage first winding, said first-stage capacitor and said impedance to switch said first-stage core or alternatively to charge said first-stage capacitor to a relatively large extent depending upon whether said core is in its one or other state, the current to charge said first-stage capacitor to said relative large extent flowing through said impedance and developing a voltage thereacross which reverse biases said diode, thereby to inhibit the flow of noise currents therethrough.

9. Apparatus as claimed in claim 8 characterized in that said impedance is a resistance.

References Cited in the file of this patent

UNITED STATES PATENTS

| | | |
|---|---|---|
| 2,713,674 | Schmitt | July 19, 1955 |
| 2,729,755 | Steagall | Jan. 3, 1956 |

UNITED STATES PATENT OFFICE

CERTIFICATE OF CORRECTION

Patent No. 3,035,254

May 15, 1962

Michael J. Moore

It is hereby certified that error appears in the above numbered patent requiring correction and that the said Letters Patent should read as corrected below.

Column 4, line 54, for "A synchronous" read -- An asynchronous --; column 5, line 59, for "fined" read -- find --; column 7, line 37, for "25" read -- 35 --; column 9, line 5, after "is" insert -- in --; same column, line 5, for "it" read -- its --.

Signed and sealed this 18th day of September 1962.

(SEAL)
Attest:

ERNEST W. SWIDER
Attesting Officer

DAVID L. LADD
Commissioner of Patents